United States Patent [19]

Naudot et al.

[11] 4,136,326

[45] Jan. 23, 1979

[54] APPARATUS FOR OBTAINING SEISMIC DATA

[75] Inventors: Jean-Claude Naudot, Nantes; Roger Cholez, La Chapelle sur Erdree, both of France

[73] Assignee: Societe d'Etudes, Recherches et Construction Electroniques (Sercel), Carquefou, France

[21] Appl. No.: 706,384

[22] Filed: Jul. 19, 1976

[30] Foreign Application Priority Data

Jul. 18, 1975 [FR] France .................................. 75 22562

[51] Int. Cl.$^2$ .............................................. G01V 1/00
[52] U.S. Cl. ..................... 340/15.5 DP; 340/15.5 GC; 340/15.5 MC
[58] Field of Search ............. 340/15.5 MC, 15.5 GC, 340/15.5 DP; 235/150.3, 181

[56] References Cited

U.S. PATENT DOCUMENTS

| | | | |
|---|---|---|---|
| 2,958,048 | 10/1960 | Woods | 340/15.5 GC |
| 3,202,926 | 8/1965 | Ford et al. | 340/15.5 GC |
| 3,398,395 | 10/1968 | Ward | 340/15.5 GC |
| 3,404,261 | 10/1968 | Jespers et al. | 235/181 |
| 3,495,076 | 2/1970 | Jespers et al. | 235/181 |
| 3,612,845 | 10/1971 | Lawlor | 235/150.3 |
| 3,699,325 | 10/1972 | Montgomery, Jr. et al. | 340/15.5 GC |
| 3,838,413 | 9/1974 | Wehrmann | 235/150.3 |
| 3,860,799 | 1/1975 | Donko | 235/150.3 |
| 3,863,201 | 1/1975 | Briggs et al. | 340/15.5 GC |
| 3,930,145 | 12/1975 | Fort et al. | 340/15.5 DP |
| 3,968,471 | 7/1976 | Squit | 340/15.5 AP |
| 3,986,008 | 10/1976 | Fort et al. | 340/15.5 DP |
| 3,986,162 | 10/1976 | Cholez et al. | 340/15.5 DP |
| 4,001,768 | 1/1977 | Fort et al. | 340/15.5 DP |
| 4,021,649 | 5/1977 | Fort et al. | 340/15.5 DP |

FOREIGN PATENT DOCUMENTS

| | | | |
|---|---|---|---|
| 1184652 | 3/1970 | United Kingdom | 340/15.5 DP |
| 1415091 | 11/1975 | United Kingdom | 340/15.5 DP |

OTHER PUBLICATIONS

Automatica, vol. 4, pp. 393-401, Pergamom Press 1968, Barker et al.
40th Annual Int. SEG Meeting, 10/12/70, "SOSIE" a New Seismic Method, pp. 1-23.
Electronics, 7/10/67, pp. 72-79, Gaines (II).
Fall Joint Computer Conference (1967) pp. 635-644, Poppelbaum.
Norma Technical Information, VIII/II (1971) pp. 3-12 Wehrmann (II).
Norma Technical Information IX/I (1972), pp. 10-24, Kraus et al.
Quarterly Progress Report (10/65) Dept. Comp. Sci., U. of Illinois, pp. 12-14.

Primary Examiner—Stephen C. Bentley
Assistant Examiner—S. A. Cangialosi
Attorney, Agent, or Firm—Beall & Jeffery

[57] ABSTRACT

Apparatus for obtaining seismic data or information in the field comprises electrical communication paths established between seismic detectors distributed over the ground, and a digital seismic data recorder. Each of the paths comprises a pre-amplifier, various filters, a regulable-gain amplifier, and finally a digitizer, or the paths have these elements at least partly in common. The digitizer operates by carrying out random weighing; it comprises a pseudo-random generator and at least part of the contents of this generator is loaded in parallel into a register. The pseudo-random number thus obtained is converted into an analogue signal and is used for weighing a sample of the seismic signal in a comparator. This gives a single bit each time, which is then recorded in the recorder.

6 Claims, 11 Drawing Figures

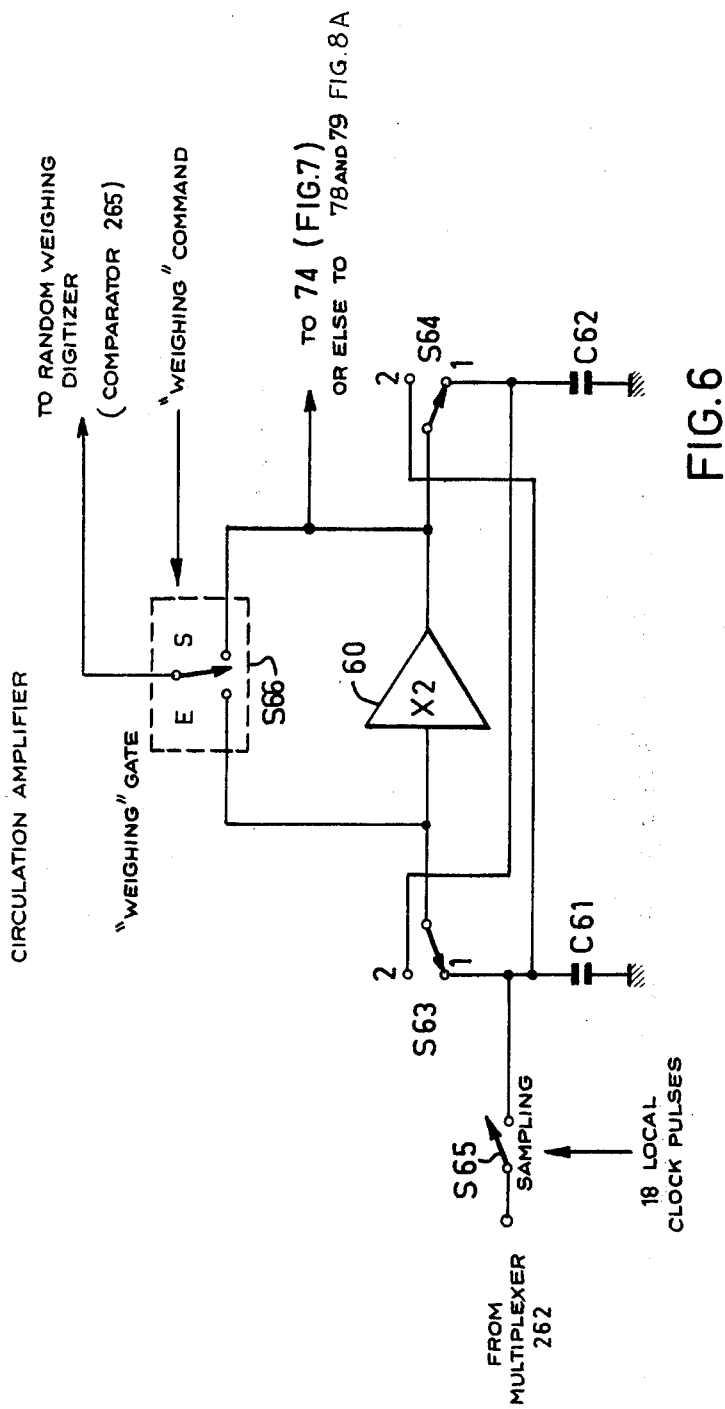

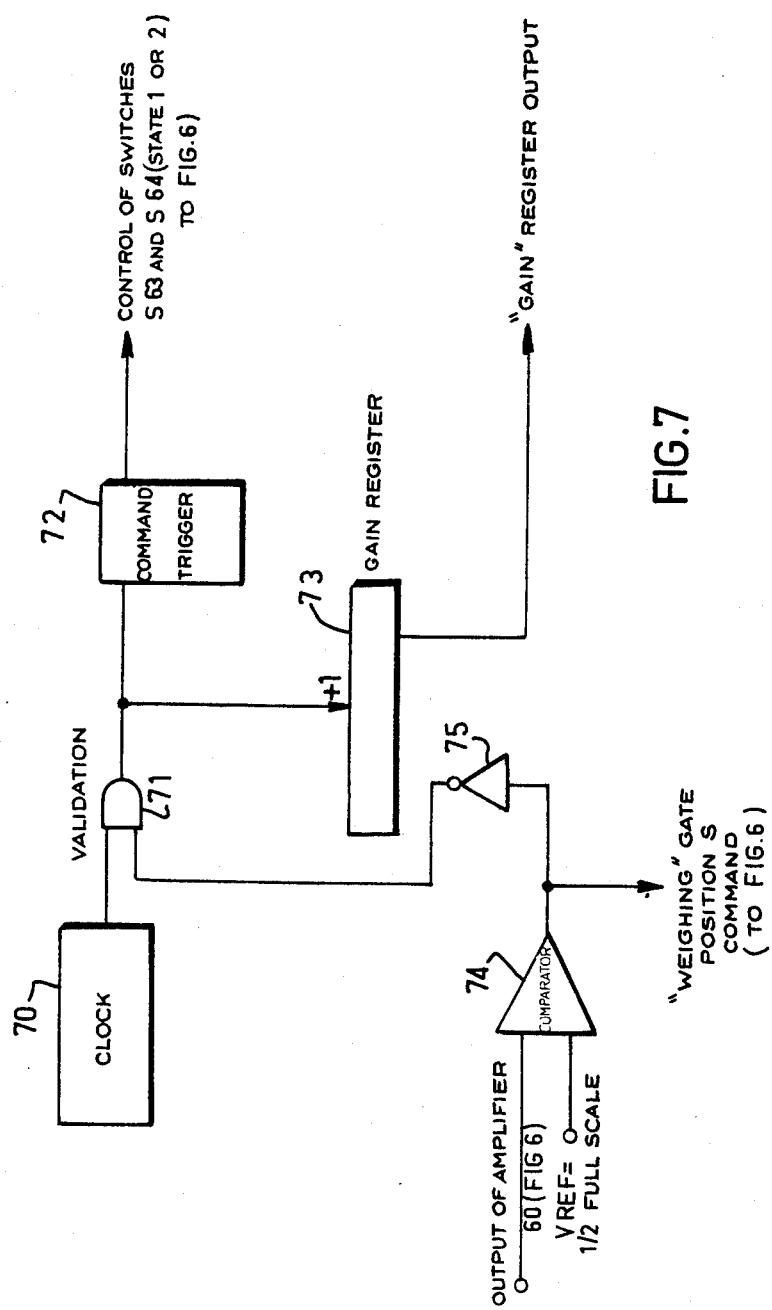

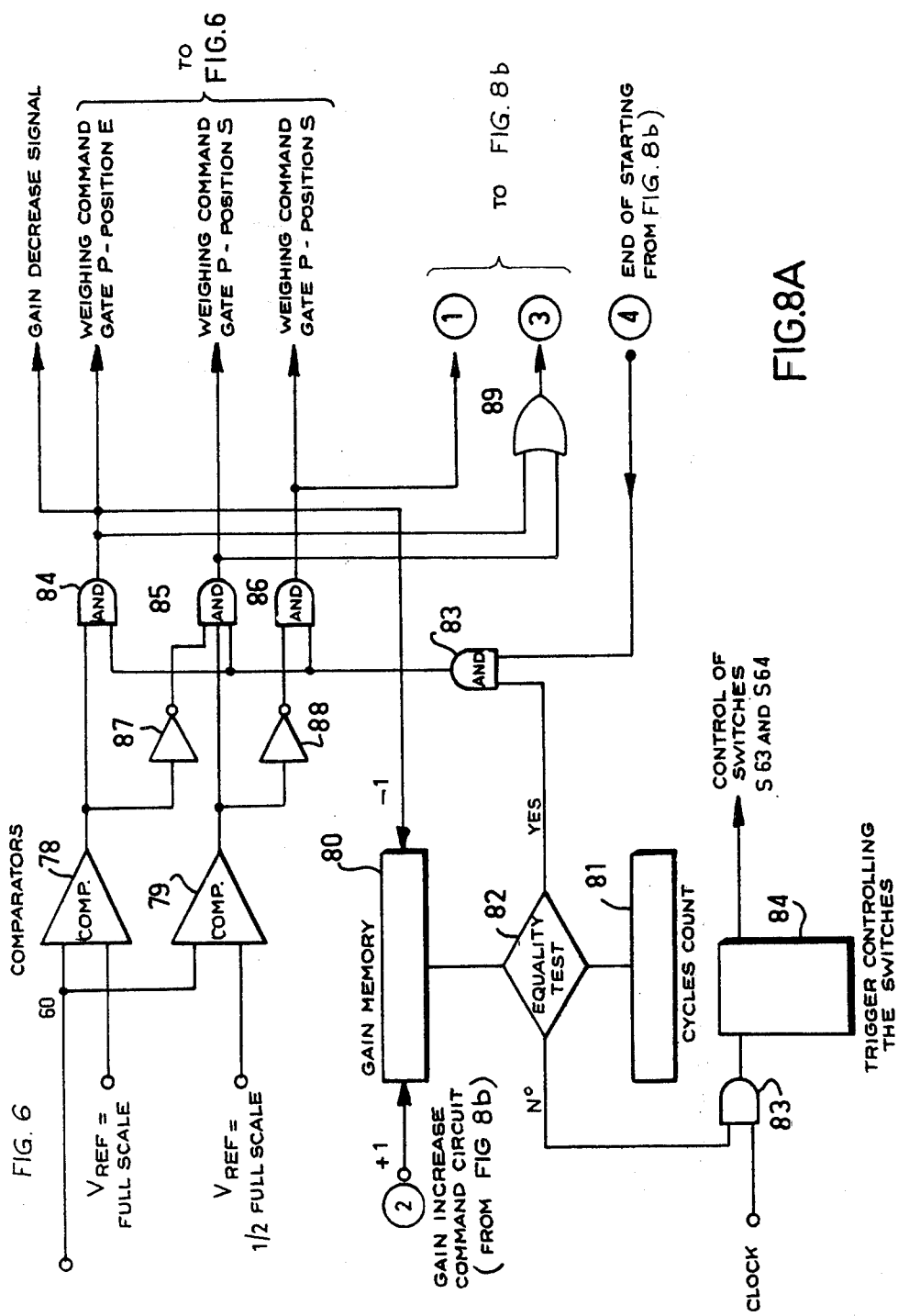

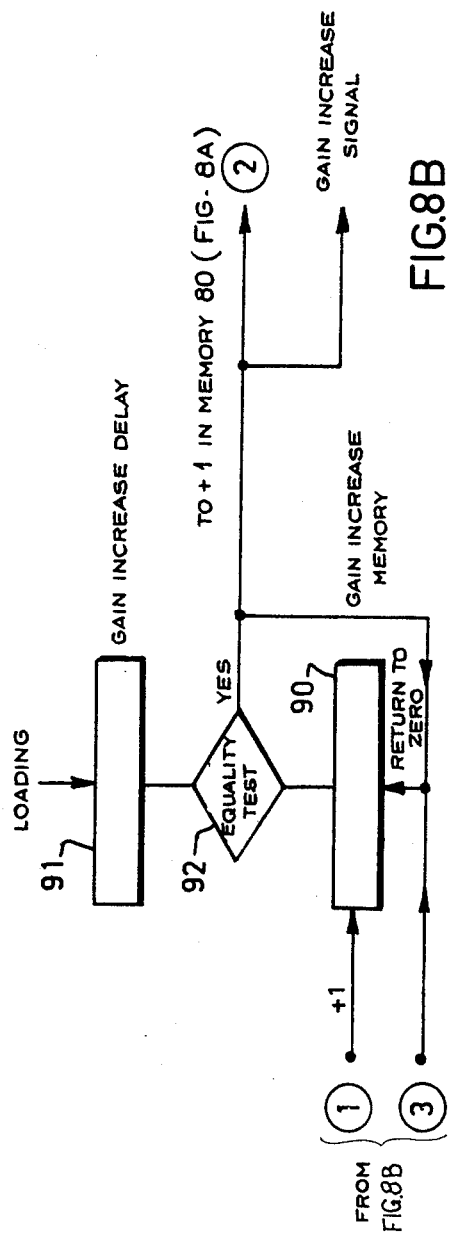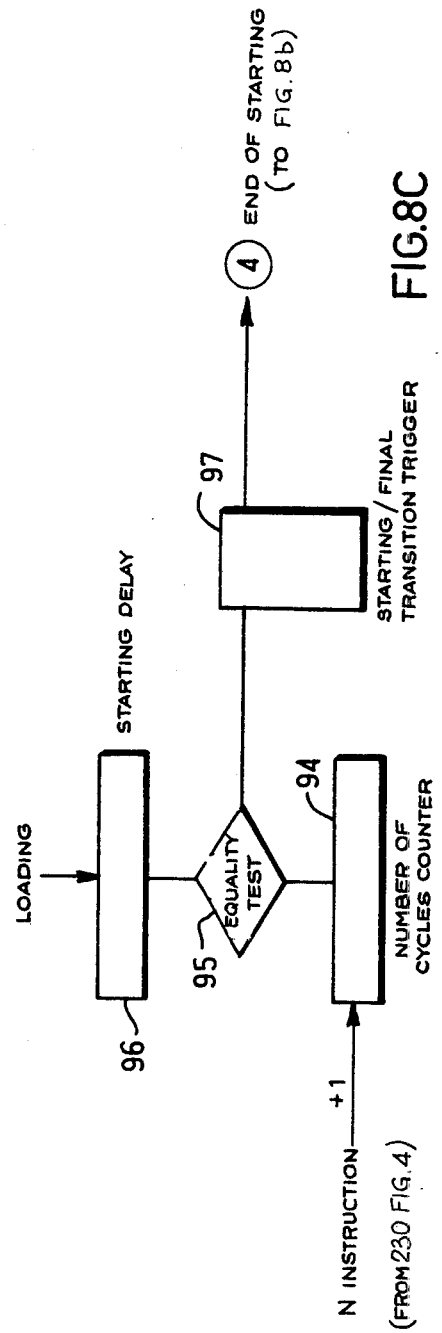

APPARATUS FOR OBTAINING SEISMIC DATA

BACKGROUND OF THE INVENTION

1. Field of the Invention

The present invention relates to obtaining seismic data or information.

2. The Prior Art

For the seismic study of subterranean formations, a perturbation is produced in these formations, for instance by means of an underground explosion or of a powerful vibrator, and the seismic signals consequent on this perturbation are recorded after they have been picked up by detectors distributed over the ground in appropriate configurations.

Recording was at first effected in analogue form; the recorded signal varied as the signal picked up by the detectors. Seismic signals soon came to be recorded in digital form; the recorded signals now represent a sufficiently great number of measurements of the signals picked up by the detectors to constitute a satisfactory representation of them.

The main difficulty in recording is that the seismic signals have a very great dynamic range, extending over 140 decibels. In the former technology efforts were made continually to improve the fidelity of recording. This has been made possible firstly by the recording of signals in digital form instead of analogue signals, and secondly by the fact that the measurement giving these digital signals has been made more and more precise. We have thus reached on the one hand a field of measurement in which the scale is extremely fine, that is to say it has a large number of points, and on the other hand floating point digitization; in this, each seismic signal sample is amplified, before being measured, with a variable gain so determined that its comparison with the very fine scale of measurement reliably provides a maximum number of significant figures.

SUMMARY OF THE INVENTION

The present invention relates to an apparatus for obtaining seismic data in the field, which calls for complete reconsideration of this development of earlier technology.

The invention makes use of a new principle of obtaining seismic data. Instead of measurement with high precision, the seismic signals are subjected to "random weighing". That is to say, each sample is compared with a random reference, taken by chance from a scale of measurement which has a number of points (see example 256) which is small as compared with the very precise scales of measurement of the prior art (up to 32, 768 points).

This provides a single bit at each random weighing of a sample of the seismic signal.

This method is itself known in stochastic analysis procedures used for instance in the field of digital voltmeters. It differs from these, however, in one essential point; in standard stochastic analysis, a large number of random weighings of the same signal is carried out, and this gives one bit each time, and the mean of all these random weighings is taken, and this gives the required measurement. In the principle applied by the present invention, each weighing is carried out only once and there is only one weighing of a given sample.

Each random weighing or measurement thus effected has no significance when taken by itself. Similarly, the sequence of random measurements which will be carried out on samples relating to one and the same detector, which is called a "trace", has no significance of its own, and the trace cannot be analysed by itself. In other words, the final result, that is to say the "seismic section" which consists of all of the traces associated with all of the detectors loses its present nature. On the other hand, as a whole the seismic section still represents the phenomena being studied and this representation has a quality at least comparable with and often even superior to that of the seismic sections obtained by using the standard recording of signals digitized with high precision.

In the representation, the useful phenomenon (seismic reflection) appears only by a coherence of events at the level of 'the image' analysed by a random raster. This method involves the recording of a number of measurement points much higher than at present.

An object of the present invention is to provide an apparatus for obtaining, in the field, seismic data with random weighing digitization, which is capable of recording a large number of traces, that is to say of operating with a large number of detectors.

The apparatus for obtaining seismic data or information in the field is of the type in which electrical paths of communication are established which start from seismic detectors (sensors) distributed over the ground and end at a recorder of digital seismic data; each of these paths comprises a digitizing means, or the paths have a digitizing means at least partly in common.

According to the invention, the digitizing means carries out random weighing. The term "random" is used here as equivalent to quasi-random. Actually, obtaining purely random phenomena is not within the power of apparatus constructed by man, which are only quasi-random. The digitizing means preferably comprises a quasi-random digital signal generator, and means adapted to compare at least a part of the digital signal of this generator with a sample of the analogue signal which is present on the path of communication.

In a preferred embodiment, in this digitizing means the quasi-random digital signal generator is a shift register looped by a logical combination of at least two of its stages, and the comparing means comprises a digital-to-analogue converter coupled to at least a part of the stages of the pseudo-random generating shift register, and an amplifier-comparator of which the reference input is connected to the output of the digital-to-analogue converter, and of which the input for the analogue signal to be compared is mounted in series on the path of communication to receive seismic signal samples on this path. In this way, the 1 or 0 state of the output of the comparator each time represents the weighing of a sample of the seismic signal relatively to the random reference.

With this random weighing digitization, the need to use a variable gain amplifier upstream from the digitizing means is not so great as in the prior art. But a very great advantage is gained if each of the paths of communication comprises a variable gain amplifier of this kind upstream from the digitizing means, or the paths have such an amplifier at least partly in common.

Preferably, a blocking sampler (sample and hold circuit) is located upstream from the random weighing digitizer. The digital-to-analogue converter receives the contents of an intermediate shift register, and this shift register is coupled to at least a part of the stages of the pseudo-random generating shift register. At each random weighing, the intermediate register is loaded in parallel. At this moment, the output of the amplifier-comparator is recorded; this output gives a 1 or 0 level according to the result of the comparison of the seismic signal sample with the reference taken at random.

The various paths of communication may be constructed in accordance with the various arrangements derived from the prior art, and end at the recorder.

In the preferred embodiment, a plurality of paths starting from detectors pass in parallel through the same number of pre-amplifiers and filters, and are re-grouped by a low level multiplexer. They are then applied in series to the variable gain amplifier and then to the random weighing digitizer, and this gives one bit each time, and the bits thus obtained are transmitted to the magnetic recorder of seismic data.

More precisely, the apparatus for obtaining seismic data in the field comprises, in its preferred embodiment, a central unit and a series of boxes distributed over the ground and each associated with n detectors; these boxes are connected to a single path of communication, which preferably forms a loop starting from the central unit and ending at this unit. A generator of synchronization and instruction signals which will pass through the loop and act on the boxes is placed at one end of the loop, in the central unit, and the digital recorder is connected to the other end of the path of communication. Each box is located geographically in the vicinity of the n detectors with which it is associated, and the single path of communication effects the transfer of signals from the boxes to the digital recorder, in a manner which is controlled by the generator of synchronization and instruction signals. Each box comprises n chains of pre-amplifiers and filters connected respectively to the n detectors with which the box is associated. The outputs of these chains are re-grouped by a low level multiplexer followed by the variable gain amplifier and then by the random weighing digitizer. A digital word shift register forms a word of at least n bits by means of the n bits from the output of the digitizer which are obtained in sequence for the n detectors by the action of the multiplexer. The box is also capable of acting as a repeater relay along the single path of communication, and also of injecting on to this path the digital word of the register which has just been mentioned, and this is done under the control of the synchronization and instruction generator.

In this preferred embodiment, there is one shift register generating pseudo-random digital signals in each box. Another register generating pseudo-random signals is placed in the central unit and supplied at a high clock frequency. An initial loading word for each of the pseudo-random generating registers in the boxes is taken in succession from this central pseudo-random generator; the pseudo-random generating registers in the boxes will therefore be loaded in a manner quasi-independent of one another. In each box, by means of the auxiliary register a part of the contents of the local pseudo-random generating register is taken at each successive random weighing, and therefore all the successive samplings are statistically independent of one another.

In this way, the weighing is truly random for all the detectors of which the signal will be taken to the recorder of the central unit.

The synchronization and instruction generator first commands the cycle of initial loading of the pseudo-random generating registers in the boxes; next, it will command the collection of the seismic data, in the form of a series of cycles, in each of which the digital words which are in the word registers of the various boxes are taken out in sequence and sent to the recorder.

BRIEF DESCRIPTION OF THE DRAWINGS

The invention will now be described in more detail by way of example with reference to the accompanying drawings, in which:

FIG. 6 is an electrical diagram illustrating the basic element of the regulable-gain amplifier of FIG. 4, in a binary gain or instantaneous floating point version;

FIG. 7 illustrates the command circuit of the amplifier of FIG. 6, in instantaneous floating point operation;

FIGS. 8A to 8C illustrate the command circuits of the amplifier of FIG. 6, in a regulable binary gain embodiment.

DETAILED DESCRIPTION OF THE INVENTION

Figure 1:
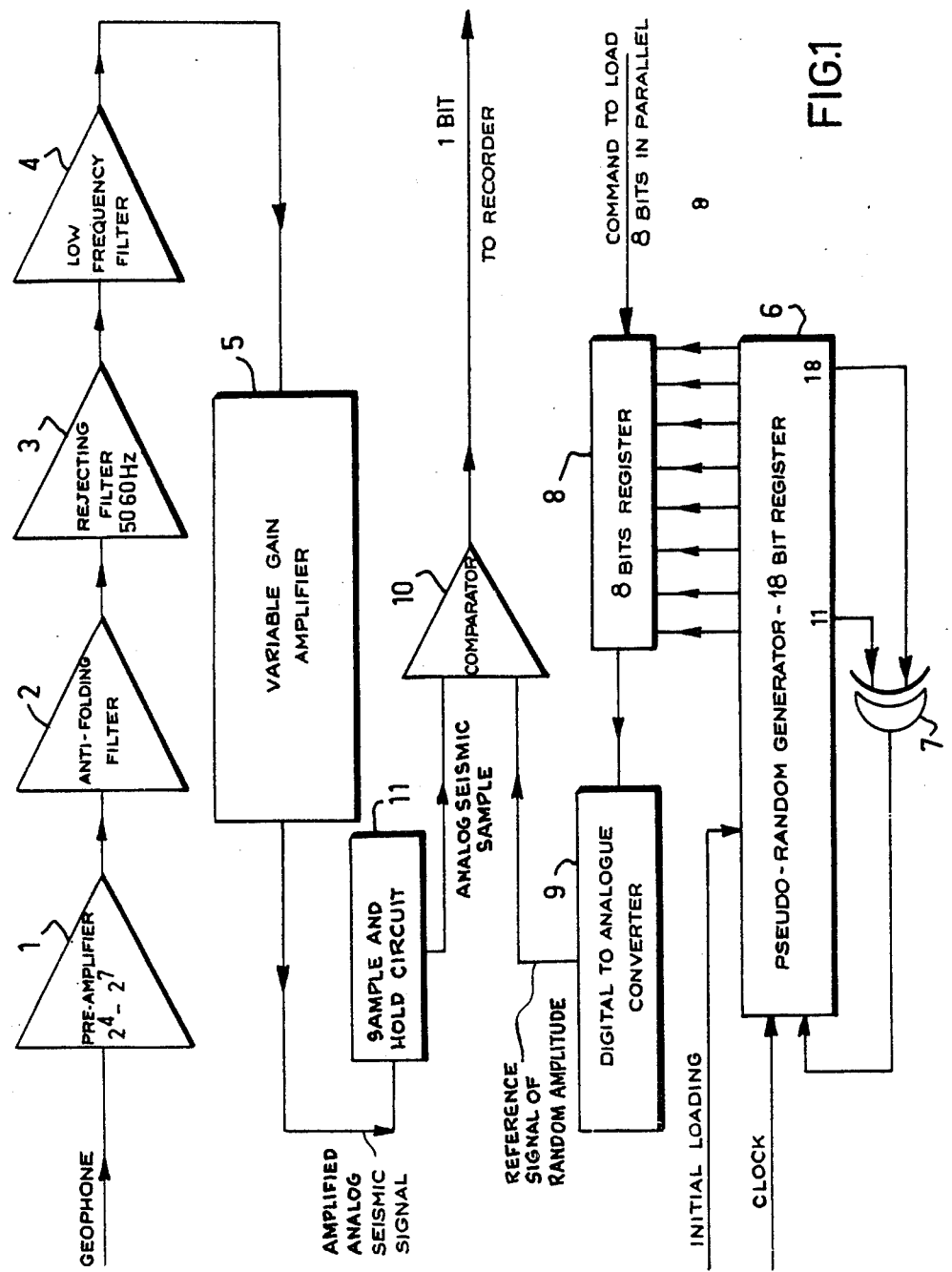
FIG. 1 illustrates an apparatus for obtaining seismic data in accordance with the invention, reduced to a single path of communication in order to be more readily understood, although it necessarily comprises a large number of such paths.

FIG. 1 illustrates an electrical path of communication between a seismic detector and a recorder of digital seismic data. This Figure is intended more particularly to facilitate understanding of the apparatus embodying the invention, in its elementary composition for a single communication path. Actually the apparatus necessarily comprise a large number of paths (e.g. several thousand), because this is necessary to ensure that the results obtained, that is to say the digital seismic data recorded, are still significant when digitization is effected by random weighing.

In FIG. 1, the path of electrical communication starts from a seismic detector (not shown in the drawing) which may consist for instance of a single geophone or else a group of interconnected geophones. The signal coming from the detector is first applied to a pre-amplifier 1, of which the gain is fixed or regulable and is generally chosen between $2^4$ and $2^7$. The pre-amplifier 1 is normally followed by a low pass filter 2 in order to avoid the phenomenon known as folding of the spectrum (anti-aliasing); this phenomenon is connected with the frequency of the analogue signal sampling which will be effected later. An industrial frequency rejecting filter 3, operating at 50 or 60 Hz according to the countries, is included after the anti-folding filter 2. This rejecting filter 3 is followed by a low frequency filter 4 which is generally adjustable and makes it possible to define the frequency range of the seismic signals which will be retained for recording.

An advantage is gained if a regulable-gain amplifier 5 is arranged after the pre-amplifier 1 and the filters 2, 3 and 4. This regulable-gain amplifier 5 makes it possible to adjust the level of the seismic signals so that the following analogue-to-digital conversion can be suitably effected. Actually, on the one hand the seismic signals are subject to very great variations in level, the ratio of the maximum to the minimum being as much as 140 dB; on the other hand, the full scale voltage of the analogue-to-digital converter is generally fixed, and the converter cannot appropriately treat signals which are above this full scale, whereas it will be inaccurate or even inoperative for signals which are very much below this. Since the range in which the converter gives a suitable measurement is less than 140 dB, in the device 5 the seismic signals are subjected to regulable-gain amplification enabling them to be brought as close as possible to the range of operation of the converter. Regulable-gain amplifiers of known type can be used here, as will be described later with reference to FIGS. 6 to 9.

The means for digitizing with random weighing embodying the invention will now be described with reference to FIG. 1.

This means comprises, firstly, a shift register 6 having a capacity equal for example to 18 bits. The eleventh and eighteenth stages of the 18 bits shift register are applied to a logical gate 7 of the exclusive-OR type, of which the output is taken to the digital signal input of the shift register 6. A clock signal is also applied to the shift register. Lastly, this register is capable of receiving for all or some of its stages a 0 or 1 state defining an initial loading of the register, the all-zero configuration being forbidden. In a manner known per se, a register of this kind will generate a sequence of bits of a pseudo-random nature, and this sequence is repeated at the end of 262, 143 bits ($2^{18}$-1).

At least a part of the contents of the pseudo-random generating register 6 is taken into an intermediate register 8. As shown, the register 8 receives the parallel loading of the last eight bits (stages 11 to 18) of the register 6. At a given instant, the register 8 will therefore take 8 bits from the quasi-random sequence of bits which is produced in the register 6, and these 8 bits define a number which also is of a quasi-random nature.

The number thus obtained is applied to a digital to analogue converter 9 which will produce an analogue signal corresponding to the 8 bits of the register 8, with respect to a reference voltage within the converter. Since 8 bits define 256 different states, the converter 9 will therefore supply an analogue signal chosen at random from 256 possibilities.

The analogue signal is applied to a reference input of a comparator 10 to the other input of which receives, through the intermediary of a blocking sampler 11 (sample and hold circuit), the seismic signal provided at the output of the regulable-gain amplifier 5.

Thus, the whole of the elements 6 to 11 forms an analogue-to-digital converter with quasi-random weighing, of which the reference voltage is in fact the reference voltage of the digital to analogue converter 9. Actually, each loading in parallel of the register 8 will be followed by a new random reference value applied to the comparator 10 by the digital to analogue converter 9. At this moment, the seismic signal set by the blocking sampler 11 is compared with the random reference, thus producing a 1 or 0 bit according for instance to whether it is greater or less than this, and this bit will then be sent to the recorder each time.

Moreover, the converter constructed in this way produces random weighing with the aid of 256 measurement points, whereas the analogue to digital converters used in the prior art frequently had up to 32, 768 measurement points. As will be understood by a person skilled in the art, the result of this lower number of measurement points is that the noise and distortion characteristics of the elements located upstream from the random weighing converter are subject to considerably less stringent requirements; this applies to the pre-amplifier 1 and to the filters 2 to 4 and also to the regulable-gain amplifier 5.

As has been indicated above, to simplify the description FIG. 1 is limited to a single seismic path, but the apparatus for obtaining seismic data can give results only with a large number of paths.

Several arrangements of the electric paths of communication between the detectors and the recorder of seismic data are known.

The simplest and oldest consists in providing a respective path of communication for each detector. The detected signal takes a journey of great length and arrives at a central treatment unit mounted on board in a laboratory truck where the signal is first applied to a pre-amplifier 1; one of these is provided for each detector. The central treatment unit also comprises the filters 2 to 4 and the regulable-gain amplifier 5 for each detector. After that, a multiplexer regroups all the paths in such a way that a single analogue to digital converter can treat all of them, and the seismic signals determined each time by this converter are applied to the seismic data recorder.

In a second arrangement, the multiplexer is mounted upstream from the regulable-gain amplifier 5, but the geographical arrangement of the other elements is not changed. The result of this is that there is only one regulable-gain amplifier 5 for all the paths. In this case, the multiplexer is a low level multiplexer which may be for instance of the type used in the digital seismic recording systems SN 328 and SN 338 manufactured by Societe d—Etudes, Recherches et Constructions Electronique-SERCEL- of Carquefon, France. The regulable-gain amplifier is then for instance either a regulable binary gain amplifier of the type which appears in SERCEL's digital seismic recording system SN 328, or an instantaneous floating point amplifier of the type used in their digital seismic recording system SN 338.

A third and more recent arrangement has been described in French Pat. No. 73 25 207 in the name SERCEL, entitled "Multiplexed digital transmission of seismic signals" and published under No. 2,237,552 (corresponding U.S. Pat. No. 3,986,162). In this third case, the geographical arrangement, on the ground, of the elements of the apparatus for obtaining seismic data is radically different from the preceding cases. Actually, each detector is associated with a box which is very close to the detector and which comprises all the elements of the apparatus up to and including the analogue to digital converter. Thus it comprises the pre-amplifier such as 1 and the filters such as 2 to 4. After that, the instantaneous floating point amplification and the analogue to digital conversion are effected by means of the apparatus described in French Pat. No. 72 00 799, also in the name SERCEL, entitled "Amplifier of Samples of Analogue Signals with Automatic Gain Regulation, and Circuit for Floating Point Digitization of such Samples", and published under No. 2,167,263; corresponding British Pat. No. 1,415,091 (corresponding U.S. Pat. No. 3,936,819). Moreover, a single transmission path passes twice through each box, forming a loop, starting from a generator of synchronization and instruction signals installed on board the central unit, and finally returning to the recorder of digital seismic data of the central unit. Each box may perform the function of a repeater amplifier on this transmission path, and may also introduce into the path its own digital signals corresponding to the digitization and the floating point amplification of the seismic signals of the detector associated with this box.

Any suitable arrangements of the paths of communication between detector and recorder can be used. It is only necessary to multiply the basic system described with reference to FIG. 1 for a single path of communication. In particular, the three arrangements which have just been described may be used in this way.

However, it is extremely advantageous to use the third of these arrangements, which is described in French Pat. No. 73 25 207 (U.S. Pat. No. 3,986,162). The preferred embodiment of the present invention within the framework of this third arrangement will now be described with reference to FIGS. 2 to 9.

First of all this arrangement will be described in a general way with the aid of the accompanying FIGS. 2 and 3. This description of FIGS. 2 and 3 repeats the description of FIGS. 1 and 2 of French Pat. No. 73 25 207 already referred to, with modifications enabling the present invention to be appreciated and carried into effect.

Figure 2:
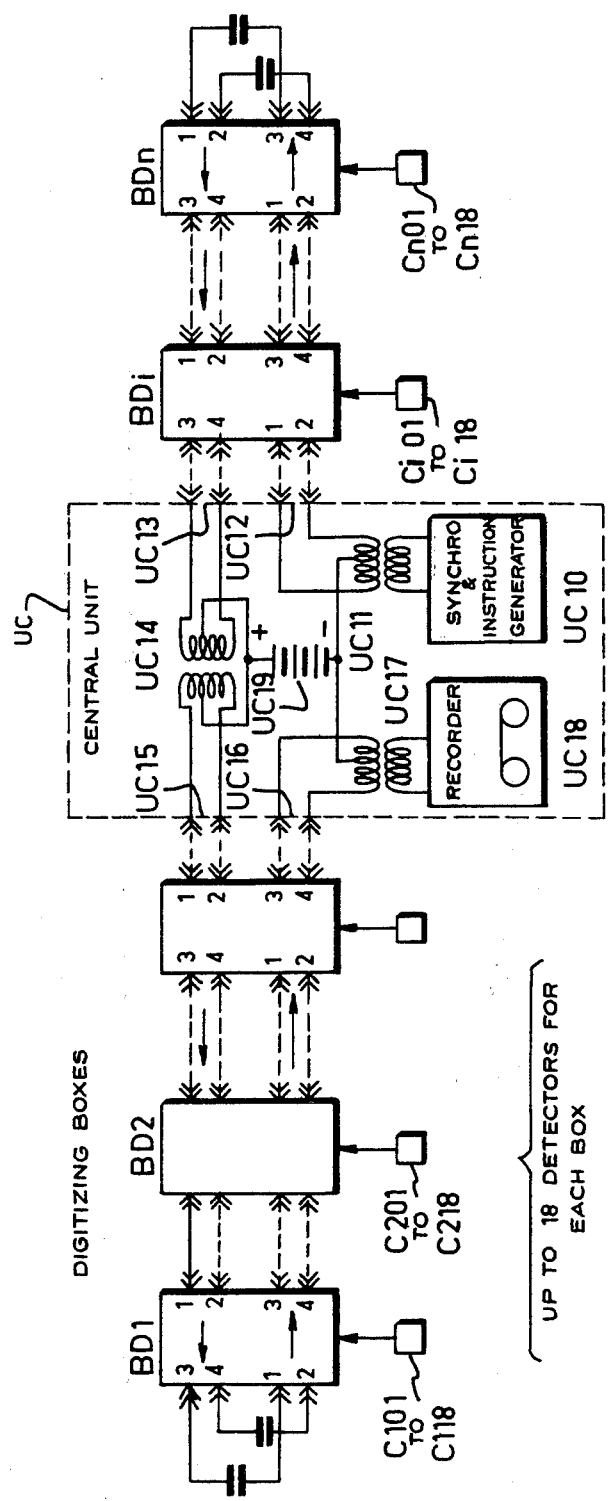
FIG. 2 illustrates a system of the whole of an apparatus for obtaining data in accordance with the invention, in its preferred embodiment.

In FIG. 2, a central unit UC comprises a generator UC10 and a magnetic recorder UC18. Through the intermediary of a transformer UC11, the generator UC10 is coupled to a bifilar output UC12.

On the other hand, a bifilar input line UC 16 is coupled to the magnetic recorder UC18 through the intermediary of a transformer UC17.

The central unit also comprises another input line UC13 which is directly coupled to a bifilar output UC15 through a transformer UC14.

Towards the right of the central unit, the two bifilar lines UC12 and UC13 form a 4 conductor group (or quad) which is applied successively to digitizing boxes such as BDn. At the left of the central unit, and in the same way, the two bifilar lines UC15 and UC16 form a quad and are applied successively to digitizing boxes such as BD1 and BD2.

The digitizing boxes are counted starting from the left in FIG. 2. Each box is associated with a plurality of seismic detectors (for instance 18). The numbers of the detectors begin with a figure which reproduces the number of the box; for instance, detectors $C_{n1}$ to $C_{n18}$ are associated with the digitizing box BDn.

As shown in FIG. 2, the transmission path passes through each digitizing box twice, once in the bottom part of the box and once in the top part. Thus, the bifilar line UC12 enters the box BDi at its inputs 1 and 2 and leaves it by the outputs 3 and 4 located at the same level. This is repeated up to the box BDn.

At the level of this box, the outputs 3 and 4 in the bottom part are connected to the inputs 1 and 2 in the top part by means of condensers. This illustrates the fact that the connection is made for transmitting alternating currents while blocking continuous voltages, for the purposes which will be described hereinafter. These condensers are of course only a simplified illustration.

The same type of connection as described previously is again used from the box BDn as far as the box BDi. After the outputs 3 and 4 of the top part of the box BDi, the line passes through the central unit from UC13 to UC15. There, too, there is an alternating current connection suppressing continuous voltages.

Starting from UC15, the top parts of the boxes are again coupled as described previously, as far as the box BD1. At the level of this box a coupling is effected between the top part and the bottom part of the box as in the case of the box BDn.

Lastly, the bottom parts of the boxes are again connected directly, as far as the input UC16 of the central unit.

Thus, the path of electrical transmission or communication starts from the generator of synchronization and instruction signals UC10, and first passes through the bottom parts and then through the top parts of the boxes on the right, and afterwards through the top parts and then through the bottom parts of the boxes on the left, and finally returns to the recorder UC18.

The transformer UC14 has two centre taps connected in common to the positive pole of a direct current supply source UC19. The secondary of the transformer UC11 and the primary of the transformer UC17 each have a central tap, and these two central taps are connected in common to the negative pole of the source UC19.

In this way, a positive voltage is applied in common to the top part of each box, whereas a negative voltage is applied in common to the bottom part of each box. It will now be understood that the condensers described with reference to the casings BD1 and BDn prevent this continuous voltage from being short-circuited.

Figure 3:
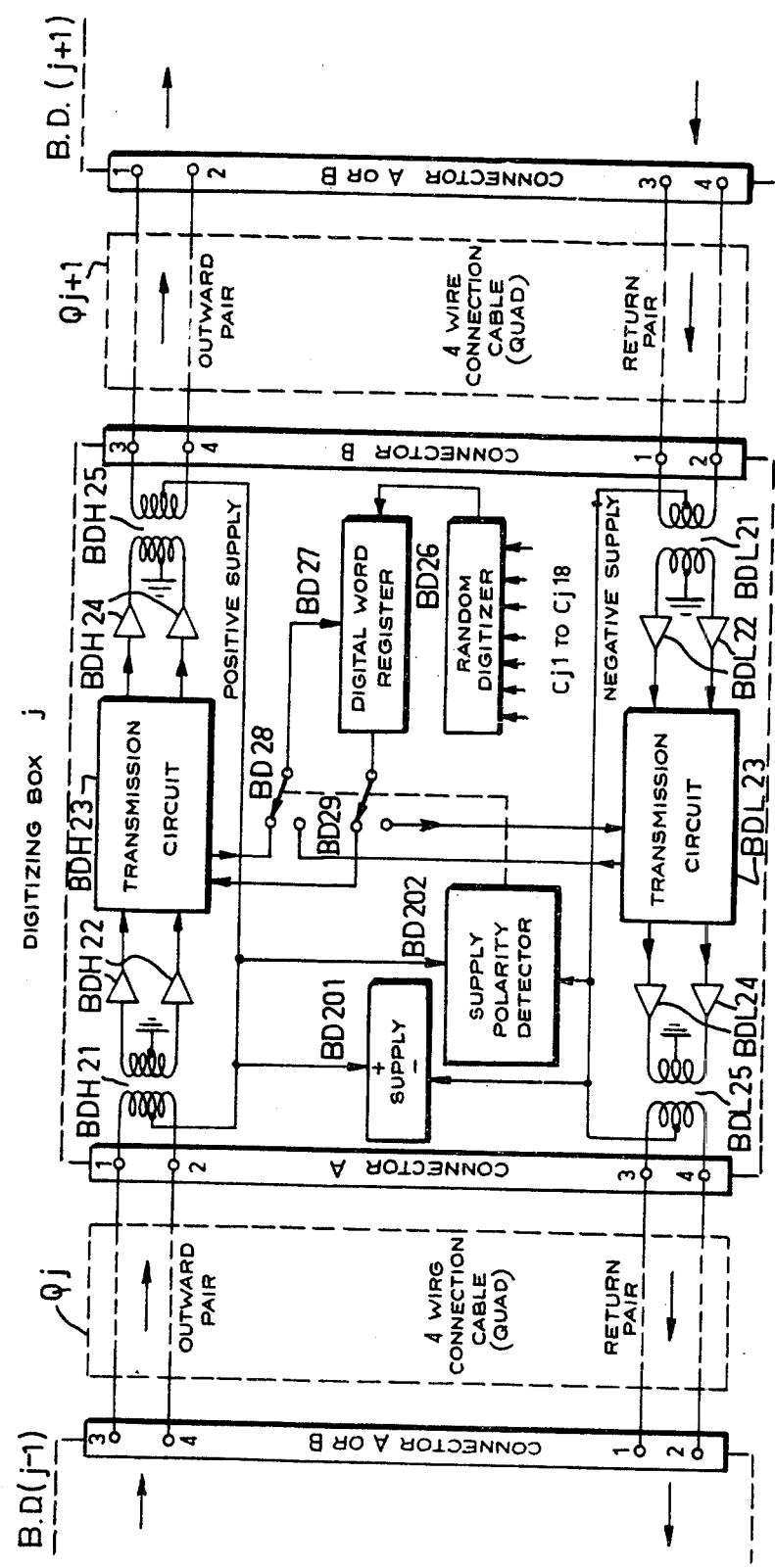
FIG. 3 illustrates in further detail a digitizing box forming part of the apparatus for obtaining data of FIG. 2, and elements surrounding this box.

FIG. 3 shows 3 successive digitizing boxes numbered respectively $j - 1$, $j$ and $j + 1$. The boxes are all identical, and for this reason only the box BDj is illustrated in detail. Each box comprises two identical connectors A and B. The input of the top part of the box is connected to the contacts 1 and 2 of the connector A, and its output is connected to the contacts 3 and 4 of the connector B. The input of the bottom part of the box is connected to the contacts 1 and 2 of the connector B, and its output is connected to the contacts 3 and 4 of the connector A.

The cables with two pairs (or quads) such as Qj and Qj + 1 are thus equipped with connectors, and the pairs are connected to these connectors in such a manner that they cross one another, each pair connecting the contacts 1 and 2 of the connectors to the contacts 3 and 4 of the connector fixed at the other end.

In each digitizing box there is a top part and a bottom part, as has been stated above. These parts are identical, and the elements of the top part will be distinguished by the letters BDH and the elements of the bottom part by the letters BDL. In each box there are also common parts, comprising essentially the digitizer and its output register.

In this instance this digitizer comprises a circuit for digitizing with random weighing, as will be shown hereinafter.

In FIG. 3 the box BDj comprises, starting from the inputs 1 and 2 of the connector A, a transformer BDH1 of which the windings have centre taps; the centre tap of the secondary is earthed. The two ends of the secondary winding are coupled respectively, through the intermediary of two amplifiers BDH22, to a transmission circuit BDH23; a detailed example of the system of this circuit is given in FIG. 3 of French Pat. No. 73 25 207 (corresponding U.S. Pat. No. 3,986,162) referred to previously. The two outputs of the transmission circuit BDH23 are applied respectively to two amplifiers BDH24, and these are followed by a transformer BDH25 of which the windings have centre taps. The centre tap of the primary is earthed. The two terminals of the secondary of the transformer BDH25 are connected respectively to the contacts 3 and 4 of the connector B of the box BDj.

The centre tap of the primary winding of the transformer BDH21 is connected directly to the centre tap of the secondary winding of the transformer BD25, in order to transmit the continuous positive supply voltage which is applied in common to the line.

The bottom part of the box BDj comprises exactly the same elements, which are distinguished by the letters BDL.

The centre tap of the primary of the transformer BDH21 and the centre tap of the secondary of the transformer BDH25 are connected on the one hand to a circuit BD201 which draws the electrical supply of the digitizing box in common from the continuous voltage, and on the other hand to a polarity detector circuit BD202.

In FIG. 3 the detectors Cj 1 to Cj 18 are thus connected to a digitizing circuit BD26 supplying its digital information to a digitizer output register BD27 which is a digital word register.

The register BD27 receives clock pulses and in reply supplies its digital information. Two coupled switches BD23 and BD29 permit this exchange of signals to be made either with the transmission circuit BDH23 or with the transmission circuit BDL23. The inverting switches BD28 and BD29 are controlled by the supply polarity detector BD202, which comprises for instance a polarized relay in order to act on the switches BD28 and BD29 in such a manner that the output register BD27 of the digitizer is connected to that transmission circuit BD23 which is situated on the common positive supply side.

Thus, assuming that a sampling command is transmitted on the line, this command will pass through all the boxes in the order from BDn to BD1. The same thing will apply to any other command, emanating from the generator of synchronization and instruction signals UC 10 (FIG. 2), which will be received by the boxes in the order of installation of the detectors on the ground.

We have just described, in the preferred embodiment of the present invention, the structure of the path of transmission of digital signals from the digitizing boxes to the seismic recorder, with reference to FIG. 2, and the structure of a digitizing box with reference to FIG. 3. As has already been indicated, the invention has an essential difference from the teachings of French Pat. No. 73 25 207 (corresponding U.S. Pat. No. 3,986,162), published under No. 2,237,552, in that in the present system each digitizing box is connected to a large number of detectors, for example 18, instead of being connected to a single detector as in the earlier patent. This appears clearly in FIGS. 2 and 3. In addition and above all, in this case the digitizer BD26 is a random digitizer, constructed in a manner completely different from the prior art. Lastly, instead of being a mere output register of the digitizer, the register BD27 is now a digital word register which will make up a word of at least 18 bits by asembling the bits obtained by respective random weighings of the signals of the 18 detectors.

Figure 4:
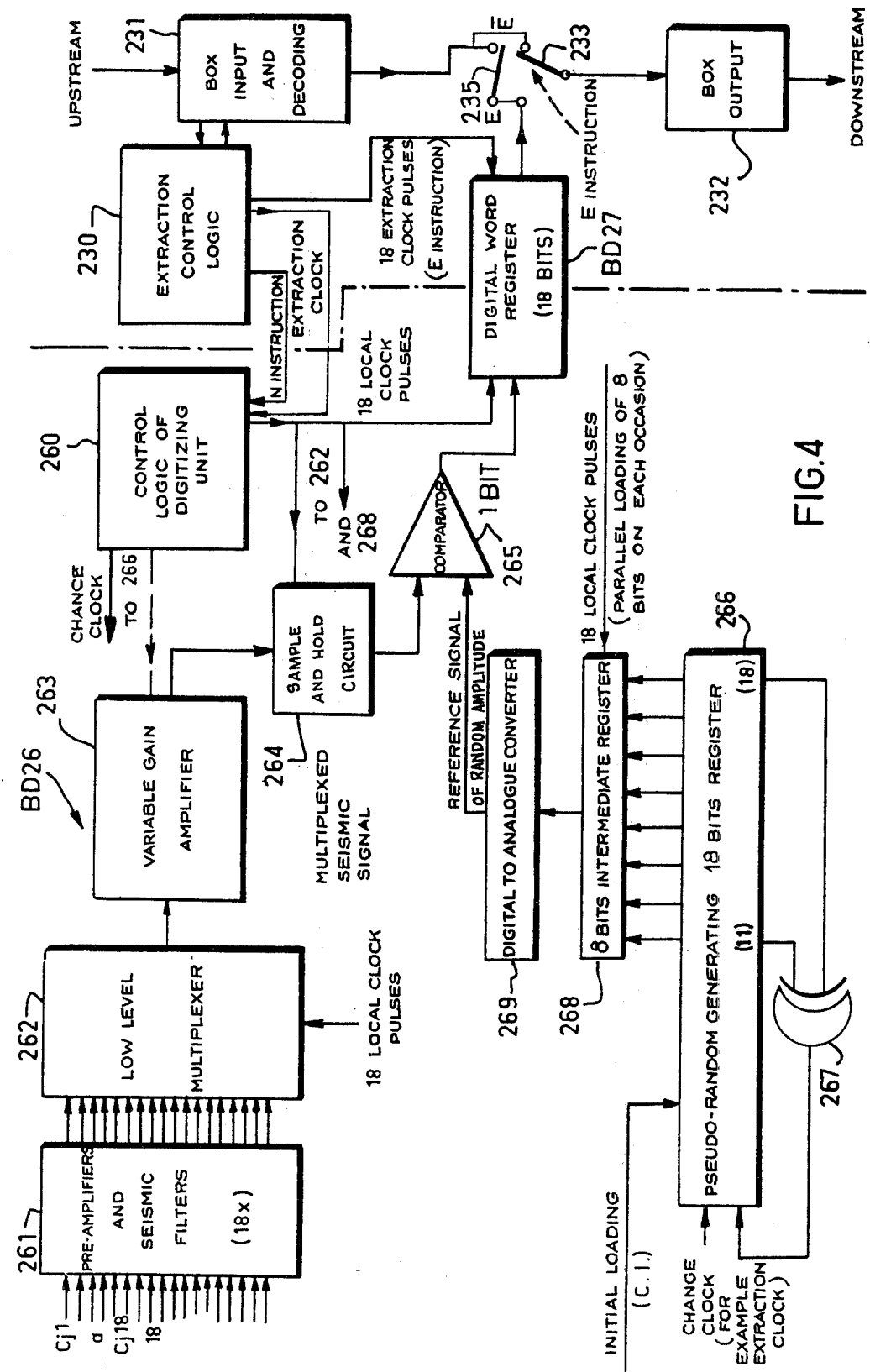
FIG. 4 illustrates in further detail the random digitizer incorporated in the digitizing box of FIG. 3, and other elements of that Figure.

FIG. 4 is an electrical diagram illustrating in further detail the random digitizer BD26 and the digital word register BD27 and, in diagrammatic form, the essential parts of the rest of the digitizing box.

To the left of the chain-dotted axis line in FIG. 4 are the elements which make up the random digitizer BD26 and with which its usual upstream elements are associated: these are the pre-amplifiers and seismic filters 261, low level multiplexer 262, regulable-gain amplifier 263 and, if required, the blocking sampler (sample-and-hold circuit) 264; a separate blocking sampler is not absolutely necessary.

These elements are the same as in FIG. 1, except that the low level multiplexer 262 takes seismic signal samples successively from each of the 18 detectors, and these signals are taken to the regulable-gain amplifier 263 and then to the blocking sampler 24 and are subsequently digitized by random weighing. The amplifier 263 and the random digitizer 265 will therefore comprise 18 seismic signal paths treated in series, that is to say sequentially, because samples taken from the 18 paths of the 18 detectors Cj1 to Cj18 connected to the box BDj in question are required in succession.

As described with reference to FIG. 1, the random digitizer comprises the blocking sampler 264 and also an 18 bits register or pseudo-random generator 266 in which the eleventh and eighteenth stages are fed back to the data input through an exclusive-OR gate 267. This register 266 also receives the chance clock which has a frequency of 4MHz and is for example the extraction clock described hereinafter. It also receives in parallel an initial loading CI in a manner which will be described hereinafter.

In response to each of 18 clock pulses, also described hereinafter, the 8 bits intermediate register 268 loads in parallel the last 8 bits of the pseudo-random generator 266. These 8 bits are transformed into a random reference signal by the digital to analogue converter 269. The random reference signal thus obtained is then applied to an input of the amplifier-comparator 265, which receives at its other input a seismic signal sample provided by the output of the blocking sampler 24 (or by the amplifier 263 if there is no separate blocking sampler).

Thus, each of the samples taken from one of the 18 paths is compared sequentially with a random reference signal which is "taken by chance" each time, and the amplifier-comparator will give one bit each time. Thus for each cycle of the low level multiplexer 262, which corresponds to 18 local clock times, a sequence of 18 bits is obtained, and each of these corresponds to the random weighing of the signal of one of the 18 detectors, and these 18 bits are introduced into the digital word register BD27 which therefore receives for this purpose the 18 local clock pulses in the same way as the multiplexer 262 and the intermediate register 268 (there may be shifts to allow for the operating times of the circuits).

The random digitizing unit BD26 also comprises control logic 260 which performs the function of producing the various signals required. The control logic 260 comprises in particular a source of clock signals for supplying, in response to an "N instruction" signal, on each occasion 18 pulses of its own clock, which will be applied to the multiplexer 262 to make it advance, to the sampler 264 (sampling command), to the intermediate register (18 bits parallel loading on each occasion), and to the digital word register BD27, as input clock pulses.

The control logic 260 also produces the chance clock which makes the pseudo-random generator 266 advance; this clock may simply use the 18 local clock pulses.

FIG. 4 also shows in simplified form the elements of one of the transmission circuits BDH23 and BDL23 of FIG. 3. It will be recalled that in FIG. 3 the circuit BD26 is connected to one of the circuits BDH23 and BOL23 by the switches BD28 and BD29. These elements are an extraction control logic 230, the transmission input circuits 231 of the box, the transmission output circuits 232 of the box, and a switch 233 which will permit the box either to function as a repeater (position $\bar{E}$) or to insert the digital word extracted from its own word register BD27 (position E).

As described in French Pat. No. 73 25 207 (corresponding U.S. Pat. No. 3,986,162), the single transmission or communication path repetitively receives bipolar signal groups from the generator UC10 of the central unit (FIG. 2). Each group begins with a synchronization element which will have the effect of warning the box of the arrival of signals and starting for instance a repetition-extraction clock in the box. An instruction then comes which may be of several types:

- E instruction (extraction) to initiate extraction of the digital word from the local word register and despatch of this word on the transmission path downstream (state E of the switch 233);
- E' instruction to initiate repetition of information from the transmission path upstream to downstream through the digitizing box in question (state $\bar{E}$ of the switch 233);
- N instruction (digitization) to initiate random digitization, during one cycle of the low level multiplexer, for the 18 detectors.

The box input and decoding circuit 231 is thus activated by the synchronization element (for example 3 bits of bipolar signal with violation of bipolarity) and it will then decode the instruction which immediately follows, to ascertain whether this is an N instruction or an E instruction. The E' instruction is not decoded, because it means simply that the 18 digital word bits which will follow must be "allowed to pass", and this is done as a matter of course in view of the fact that the state $\bar{E}$ is the rest state of the switch 233.

A cycle of operation on the path of communication can now be summarized. A cycle of this kind comprises a number of "E instruction groups" equal to the number of boxes in series on the path.

The synchronization and instruction generator will first emit an "N instruction group"; a synchronization element followed by an N instruction. In each box the N instruction is decoded; if there is nothing immediately afterwards, the control logic 230 will transmit the N instruction to the control logic 260 of the digitizing unit, which will produce the appropriate local clock times for effecting the random digitization of 18 samples respectively extracted from the signals of the 18 detectors. The 18 bits resulting from these 18 weighings are successively introduced into the digital word register BD27.

Next, the generator emits n times a synchronization element followed by an E instruction and then by a space sufficient to accommodate a digital word equal to that of the word register, in this case 18 bits.

On the first occasion on which it receives an E instruction, each box decodes this instruction and records the passage of this instruction so that this box is thereafter rendered non-responsive to E instructions up to the end of the cycle. The box transforms this instruction into an E' instruction which is sent downstream, and at the same time the box shifts its switch 233 to the state E. After the E' instruction the box sends the digital word contained in its register BD27, and finally returns its switch 233 to the state $\bar{E}$. In this way, in order starting from the synchronization and instruction generator, the first box will react to the first E instruction which it transforms into an E' instruction while putting its own digital word on to the transmission path. Since the first E instruction emitted by the generator of the central unit is transformed into an E' instruction, the second box on the transmission path will in fact receive, as its first E instruction, the second E instruction emitted by the generator, and the second box also will transform this into an E' instruction after which it sends it own digital word. This process continues, so that the nth box will receive an E instruction for the first time at the moment when it receives the nth E instruction emitted by the generator of the central unit, because the preceding (n - 1) E instructions have been successively transformed into E' instructions by the n - 1 boxes located upstream on the transmission path.

Finally, the digitizations are thus effected substantially at the same time by the boxes, and the digital recorder of the central unit subsequently receives in sequence a number of 18 bit (for example) words equal to the number of boxes in series on the transmission path; each word of 18 bits comprises the random weighing of 18 samples associated with 18 detectors.

A cycle of the same type is used for transmitting to each box the 18 bits which will make up the initial loading of the local pseudo-random generating register of the box. The initial loadings are individually taken by chance from a central pseudo-random signal generator (incorporated in the central unit and not shown in the drawings). This generator also consists of an 18 bits register looped by an exclusive-OR gate. This central register is supplied at a high clock frequency, for example 1 MHz.

A complete cycle of collection of seismic data in the field will now be described.

Figure 5:
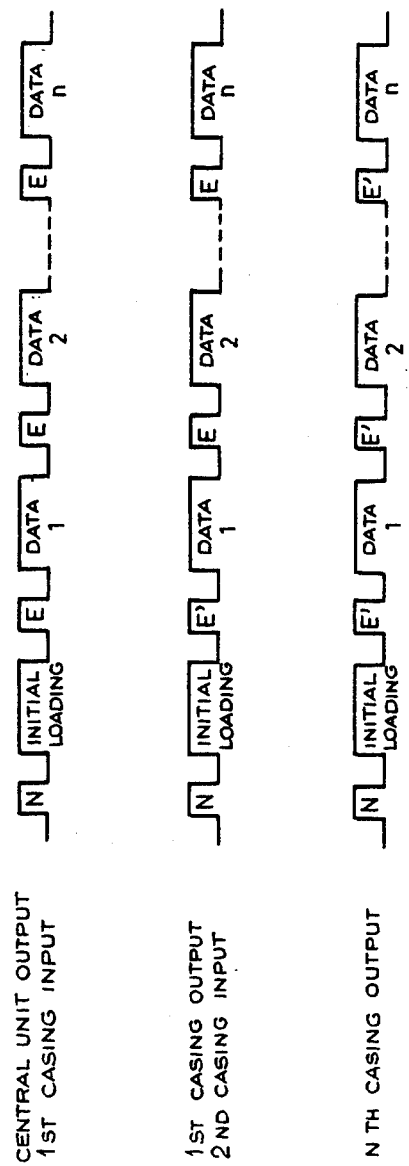
FIG. 5 is a time sequence diagram illustrating the initial loading of the pseudo-random generating registers incorporated in the various boxes.

In the phase of preparation for the perturbation (the firing of an explosive for example), as shown in FIG. 5 a command cycle is effected which comprises an N instruction group with an indicative word CI, followed by n E instruction groups.

By the indicator CI of the initial "N instruction group" each of the boxes is informed of the fact that the bits for initial change of the local pseudo-random registers are about to arrive. The digitization circuits and also the circuits for extraction from the word register are of course blocked and switch 235 (FIG. 4) is closed.

After the initial group, the process which has been described above for the introduction of digital data from the boxes into the transmission path will operate in reverse; in this case each of the boxes takes from the transmission path the data following the first E instruction received by the box. Since each box transforms this E instruction into an E' instruction in the manner described previously and then opens its switch 235, it is quite clear that the different boxes will receive different initial loading words of 18 bits. These words are taken one after another by the generator UC10 of the central unit from the pseudo-random generating register of the central unit, which advances at great speed.

Next, the boxes are brought back into their normal state, the seismic perturbation is produced and the cycle described above will be repeated a great many times by the generator of the central unit; this cycle comprises simply an N instruction and then n E instructions, n being the number of boxes.

Thus, the recording of one random weighing bit for each of the detectors is effected in each cycle, and the cycle is repeated until the signals have practically disappeared.

We have observed that it is important that the weighing should be random not only for all the detectors and all the measurements effected after a firing, but also from one recording to another. We have found that the quasi-random characteristics are naturally preserved when there is no stopping of the apparatus between two complete recordings, that is to say the pseudo-random registers operate in a continuous manner. A difficulty arises when the apparatus has been stopped in the meantime. Actually, when the apparatus is set in operation it is necessary to bring all the pseudorandom registers into a particular state. In the boxes, this initial state is determined without difficulty by a chance selection effected in the pseudo-random generating register of the central unit as described previously. There is still the pseudo-random register of the central unit, which is always brought into the same predetermined state. We have observed that in view of the high clock frequency applied to the pseudo-random generating register of the central unit, and of the fact that the time which elapses between setting the apparatus in operation and the transmission of the respective initial loadings to the various pseudo-random registers in the boxes is associated with a large number of parameters, including the operator's reaction time, the probability of having an identical distribution of the initial loadings from one operation of the apparatus to another is practically zero.

We shall now describe the construction of the regulable-gain amplifier 263 of FIG. 4. It is very advantageous to use the amplifier described in the French patent mentioned previously, No. 72 00 799, published under No. 2,167,263 (corresponding U.S. Pat. No. 3,936,819), because of its simplicity and its small consumption of electricity.

The general system of an amplifier of this kind is shown again in FIG. 6; an amplifier 60 having a gain equal to a power of 2 is connected between two condenser memories C61 and C62, and switches S63 and S64 make it possible alternately to connect one of the condensers to the input of the amplifier 60 and the other to its output, and conversely. In the initial state, the condenser is connected to the input of the amplifier 60, and a switch S65 makes it possible to sample the signal provided at the output of the low level multiplexer 262. It will be observed that this sampling performs the blocking sampler function necessary for the satisfactory operation of the random weighing converter, and that there is no need for the blocking sampler 264 of FIG. 4 when the regulable-gain amplifier is the one shown in FIG. 6.

Another switch S66 referred to as a "weighing gate" makes it possible to take the signal either at the input or at the output of the amplifier 60 after the signal has made a certain number of amplifying cycles due to the control of the switches S63 and S64 alternately connecting the condensers C61 and C62 to the input and the output of the amplifier 60.

This control of the switches is described in Pat. No. 72 00 799 (corresponding U.S. Pat. No. 3,936,819) referred to previously, in a manner providing instantaneous floating point amplification, of which the operation will first be described again with reference to FIG. 7. A clock 70 (having a frequency which is for example sufficiently greater than that of the 18 bits of the local clock) supplies signals which pass through a validation AND gate 71, after which they are applied at the same time to a bistable trigger 72 which according to its state commands state 1 or state 2 of the switches S63 and S64 of FIG. 6. Thus, at each change of state of the trigger and of the switches S63 and S64, the sample is amplified by the gain of the amplifier 60, and the register 73 keeps a record of each of these amplifications. An amplifier-comparator 74 compares the output of the amplifier 60 of FIG. 6 with a reference voltage $V_{ref}$ equal to half the full scale of the analogue to digital converter.

So long as the output of the amplifier-comparator 74 is low, this output is inverted by the inverter 75 and validates the AND gate 71. Thus the analogue sample will be repetitively amplified in this way until at the output of the amplifier 60 this sample exceeds half the full scale. When the sample exceeds this value, or, in some cases, when a maximum number of repetitions is reached, the weighing gate S66 of FIG. 6 is brought into its state S, that is to say the output of the amplifier 60, which has just exceeded the reference voltage, is transmitted to the converter for random weighing.

Although an instantaneous floating point amplifier can give good results in apparatus for obtaining seismic data embodying the invention, it is preferable to use an automatically regulable binary gain amplifier, which will be described hereinafter.

The floating point amplifier which has just been described can be used in the usual way, that is to say it really determines a new gain value for each sample. However, we have observed that the signals picked up by the 18 detectors geographically adjacent to one another which are connected to one and the same box have comparable amplitudes and merely differ slightly in phase from one another. Under these circumstances it is also possible to determine the gain by the "floating point" method for only the first of these samples, for example, and then arbitrarily to apply the same gain to the samples taken, during the same cycle, from the other detectors coupled to the same box, subjecting them to a predetermined number of cycles of predetermined amplification, this number being defined by the gain register 73.

It is then quite possible to record the gain applied, by incorporating it in the digital word of the box register such as BD27. In the case in which the same gain is applied to all the detectors, 3 bits will be needed for recording this gain, and to these it will then be possible to add only the random measurement relating to 15 detectors instead of 18. Alternatively it is possible to keep the same number of detectors and increase the capacity of the word register to 21 bits. Of course, this involves a corresponding modification to the elements of the central unit, generator UC10 and recorder UC18, and also, in some cases, for the various pseudo-random generating registers.

With reference to FIGS. 6 and 8A to 8C we shall now describe the circulation amplifier of FIG. 6, used with regulable binary gain, for the commands described on FIGS. 8A to 8C, which constitutes the preferred embodiment of the invention.

In FIG. 8A two comparators 78 and 79 both receive the output of the amplifier 60 of FIG. 6, to compare this respectively with the full scale and with half the full scale previously defined.

The general principle of regulable binary gain operation consists in applying a particular gain to each sample while testing to ascertain whether the sample amplified by this gain is between half the full scale and the full scale. When this test is negative during a certain time, the said particular gain is modified in such a manner as to tend to improve the result of the test. In the prior art matters were slightly complicated by the fact that the multiplexer located upstream from the binary gain amplifier gave consecutive samples which had no reason to need the same gain, since the different signals picked up by the different detectors did not resemble one another.

In accordance with the present system it is possible to adhere strictly to the arrangements of the prior art. However, as has already been indicated in regard to the instantaneous floating point amplifier, the signals picked up by the different detectors associated with one and the same box have comparable amplitudes and only differ slightly in phase from one another. For this reason we have observed that it is quite possible to use the same gain memory for consecutive samples coming from the different detectors associated with one and the same box, and this will now be described.

In FIG. 8A, a gain memory 80 consists of a reversible counter. Another counter 81 receives (through a connection not shown in the drawings) the number of amplification cycles effected for the sample passing through the amplifier 60. (For this purpose it is only necessary to count for example the number of changes of state of the switches S63 or S64 after the opening of the switch S65 which has set a sample). A digital comparator 82 compares the number of amplifications indicated by the counter 81 with particular gain also indicated as a number of amplification cycles by the memory 80. So long as the number of cycles effected is less than the gain determined by the memory 80, the comparator 82 validates an AND gate 83 which allows clock pulses to pass, and on each occasion these change the state of a bistable trigger 84 which on each occasion commands the change of state of the switches S63 and S64 of FIG. 6, and this produces a new amplification cycle on each occasion.

When the comparator 82 indicates equality between the number of cycles effected and the number indicated by the gain memory 80, and an "end of starting" signal which will be described hereinafter is present, an AND gate 83 validates three other AND gates 84, 85 and 86. Now there are three cases which may arise:

the output of the amplifier 60 is greater than the full scale, whereby a level 1 is produced at the output of the comparator 78; the output of the AND gate 84 is then also at the level 1, whereby the weighing gate 66 is compelled to assume its position E; thus, since the output of the amplifier 60 exceeded the full scale of the converter, the input signal of the amplifier 60 is taken, which is twice as weak and which will very probably be less than the full scale, in view of the phenomena involved;

if the output of the amplifier 60 is less than the full scale and greater than half the full scale, the low output of the comparator 78, inverted by the inverter 87, and the high output of the comparator 79 will produce a signal 1 at the output of the AND gate 85, and this compels the weighing gate S66 to assume its position S;

lastly, if the output of the amplifier 60 is less than half the full scale, the low output of the comparator 79, inverted by the inverter 88, produces a level 1 at the output of the AND gate 86, and this too compels the weighing gate S66 to assume its position S.

What has just been described concerns only the selection of the sample for weighing, by the position E or S of the weighing gate, after the number of amplification cycles determined by the gain memory 80 have been applied to the sample. We shall now show how this gain can be modified, with reference to FIGS. 8A, 8B and 8C.

In FIG. 8B a gain increase memory 90 consists of a counter of which the content is increased by one unit whenever the AND gate 86 is at the level 1, and of which the content is returned to zero by the output of the OR gate 89 whenever one of the AND gates 84 and 85 is at the level 1.

Another counter (or register) 91 may be loaded with a number (chosen for instance by the operator) which will act as a gain increase delay. Actually, a digital comparator 92 is connected between the gain increase delay memory 91 and the gain increase memory 90, and whenever it detects an equality this comparator will increase by one step the gain of the memory 80 of FIG. 8, while producing a "gain increase" signal, and will return the content of the gain increase memory counter 90 to zero. Thus, if the AND gate 86 indicates without discontinuity that the output signal of the amplifier 60 is less than half the full scale, and this takes place on a number of occasions equal to the content of the counter 91 (this corresponds to a delay), the gain determined as a number of cycles by the gain memory 80 is increased by one point, that is to say by one cycle. The gain of the amplifier 60 of FIG. 6 is 2, and therefore the subsequent samples will receive a supplementary amplification gain equal to two.

Conversely, when the AND gate 84 indicates that the amplified sample is greater than the full scale (this is actually an abnormal state in which the sample will probably be converted in an erroneous manner in digital form), the content of the gain memory 80 is reduced by one unit, and a "gain decrease" signal is produced.

The regulable binary gain amplifier has just been described as it operates in the steady state. A starting state precedes this steady state; in the course of the starting state the AND gate 83 is blocked, and this prevents any change of gain; an initial gain has been fed into the gain memory 80. In FIG. 8C, a counter 94 counts the number of cycles starting from the beginning of the measurements, for example by counting the number of N instructions. When a digital counter 95 indicates that the count reaches a predetermined value, fed for instance by the operator into a register 96, a bistable trigger 97 changes its state and produces the end of starting signal which is adapted to unblock the AND gate 83.

As has already been indicated, the regulable binary gain amplifier which has just been described constitutes the preferred embodiment of the invention. Although it is not absolutely necessary to record the gain applied to the samples, it is preferably recorded, for example by using the "gain increase" and "gain decrease" signals. Also, the control elements of FIG. 7 or of FIGS. 8A to 8C will be incorporated in the control logic 260.

Figure 9:
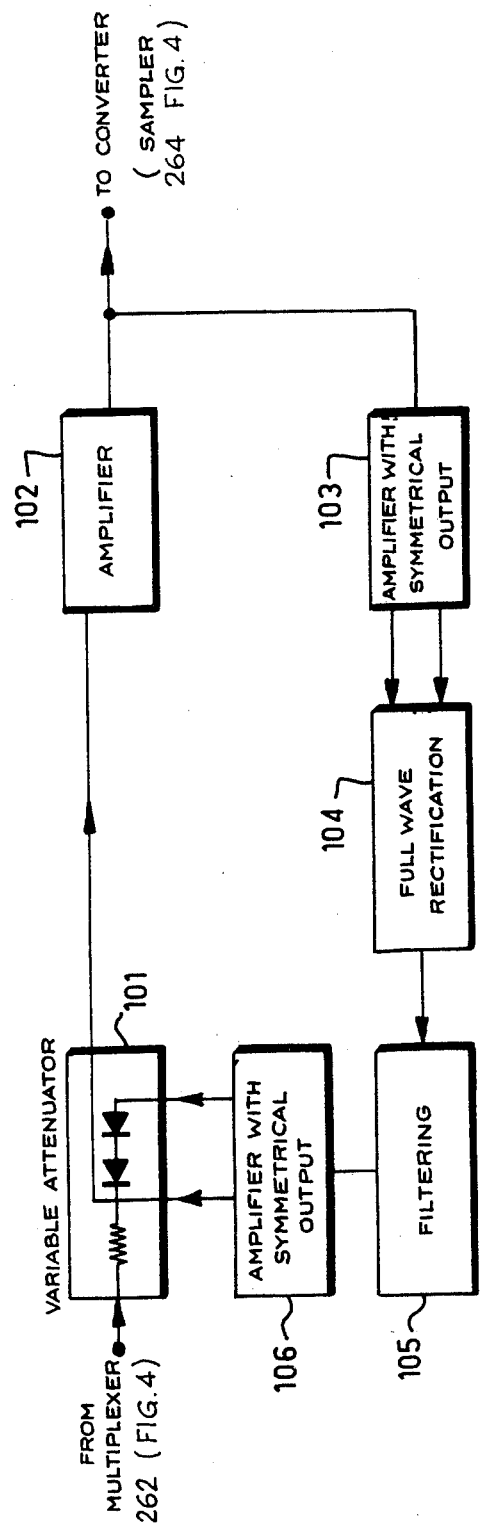
FIG. 9 illustrates an embodiment with continuously variable gain of the regulable-gain amplifier of FIG. 4.

A third embodiment of the regulable-gain amplifier is shown in FIG. 9. This amplifier consists essentially of a variable attenuator 101, for instance with P1N diodes, of known type, followed by an amplifier 102 of which the output will be applied to the blocking sampler 264. Also, the output of the amplifier 102 is applied to an amplifier 103 with symmetrical output, followed by a full wave rectification device 104. This full wave rectification device supplies an output representing the square of the level of the seismic signal, and this output is applied to a filtering unit 105 which controls an amplifier 106 with symmetrical output, which regulates the variable attenuation permitted by the P1N diodes. The filter 105 defines the speed of response of the attenuation control chain. In other words, the filtering time constant defines the slowness of the variations of gain in the amplifying unit of FIG. 9.

Of course, this continuously variable gain amplifier formerly operated with a single seismic signal. In accordance with the present system it receives a plurality of seismic signals in sequence, and use is largely made of the fact that these seismic signals have practically the same amplitudes, with only slight differences in phase, since the detectors are very close to one another.

Although the regulable binary gain amplifier is preferred, it is clear that the automatic floating point amplifier and the continuously regulable-gain amplifier are quite capable of performing the function of the regulable-gain amplifier 263 which has been described with reference to FIG. 4 as a disclosure of the preferred embodiment of the invention.

It has been emphasized above that random weighing digitization gives information of which the usefulness increases greatly with the number of detectors distributed over the ground.

In the preferred embodiment which has been described above, the number of boxes in series on the path of communication may be 250, as described in French Pat. No. 73 25 207 (corresponding U.S. Pat. No. 3,986,162).

As described above, a large number of detectors is also coupled to each box. In the preferred embodiment which has been described, each box may treat up to 18 detectors. For 250 boxes, a "seismic section" is thus obtained which comprises 4500 random weighing traces.

Of course, the invention is not limited to the preferred embodiment described or to the numbers of detectors, boxes and other digital capacities indicated.

The embodiments of the invention in which an exclusive property or privilege is claimed are defined as follows:

1. Apparatus for field recording of digital seismic data, comprising:
    an array of seismic sensors disposed relative to a subsoil structure and capable of delivering respective analog seismic signals in response to a seismic perturbation in said subsoil structure, said sensors being arranged in groups, each group associated with a digitizing unit, and said analog seismic signals containing information about said subsoil structure;
    a plurality of digitizing units, each connected to receive the analog seismic signals from a respective said group of sensors;
    means for interconnecting said plurality of digitizing units to form a digital communication channel, said digital communication channel having an input and an output;
    means coupled for recording digital signals appearing at the output of said digital communication channel;
    means for supplying predetermined control signals to the input of said digital communication channel;
    controllable means for supplying pseudo-random digital words to the input of said digital communication channel; and
    first control means for causing said pseudo-random digital word supplying means to send a plurality of different pseudo-random digital words through said digital communication channel at the outset of each recording operation, each said word being preceded by a said predetermined control signal from said control signal supplying means; and
    wherein each said digitizing means comprises:
    means including a multiplexer and a variable gain amplifier for processing the analog seismic signals from the associated said group of sensors, and delivering at an output amplified and leveled samples from the respective analog seismic signals in sets, each said set including in sequence a sample of the analog seismic signal from each said sensor of the group;
    means for locally generating pseudo-random digital signals by substantially random selection from a predetermined scale of digital reference signals;
    means for converting successive said pseudo-random digital signals into corresponding successive analog reference signals which are substantially random between themselves within a predetermined amplitude range;
    means for comparing each of said amplified and leveled samples with a respective one of said substantially random analog reference signals and for delivering at an output a one-bit binary signal upon each comparison;
    a local digital word register coupled to the output of said comparing means for storing the one-bit binary signals therefrom;
    second control means for synchronously operating said multiplexer, said variable gain amplifier, said pseudo-random digital generating means and said digital word register, whereby said digital word register receives sets of said one-bit binary signals corresponding to respective sets of said amplified and leveled analog signal samples and stores said sets as respective seismic digital words;
    means having an input and an output, for coupling said digitizing unit to said interconnecting means and for normally transmitting digital signals from said input thereof to said output thereof; and
    third control means for (a) initially responding to a said predetermined control signal by causing one of said pseudo-random words applied to the input of the digital communication channel to be received into said local digital word register and loaded in said local pseudo-random generating means, and for modifying the particular control signal responded to so that such control signal will be ignored by the subsequent digitizing units of the digital communication channel; and for (b) subsequently interrupting said normal transmission of digital signals through said coupling means and causing said local digital word register to transfer a said seismic digital word through said output of said coupling means in response to a said predetermined control signal, and for modifying the particular control signal responded to so that such control signal will be ignored by the subsequent digitizing units.

2. Apparatus in accordance with claim 1 in which said control signal supplying means is further capable of supplying an additional control signal to said digital communication channel, and said third control means is adapted to respond to said additional control signal by actuating operation of the associated second control means to produce synchronous operation of said multiplexer, variable gain amplifier, said pseudo-random digital generating means, and said digital word register, whereby said digital word register receives one said set of one-bit binary signals for each said additional control signal applied to said digital communication channel.

3. Apparatus in accordance with claim 1, wherein said variable gain amplifier comprises a stepped gain amplifier having means for gain control sensitive to the level of said seismic signals.

4. Apparatus in accordance with claim 1, wherein said variable gain amplifier comprises an instantaneous floating point amplifier.

5. Apparatus in accordance with claim 1, wherein said variable gain amplifier comprises an amplifier having continuous automatic gain control.

6. Apparatus in accordance with claim 1, wherein said analog signal processing means comprises:
  means coupled for preamplifying and filtering the analog seismic signals appearing at the output of said seismic sensors and for providing said analog seismic signals in preamplified and filtered form to said multiplexer;
  said multiplexer being coupled to receive said preamplified and filtered analog seismic signals and to deliver at an output samples of said analog seismic signals in a repetitive sequence; and
  said variable gain amplifier being a sample amplifier coupled to the multiplexer output for amplifying said repetitive sequence of analog signal samples, and including a sample and hold circuit.

* * * * *